J. HOFFMAN.
Hoisting Apparatus.
No. 6,597. Reissued Aug. 17, 1875.
Fig. I.
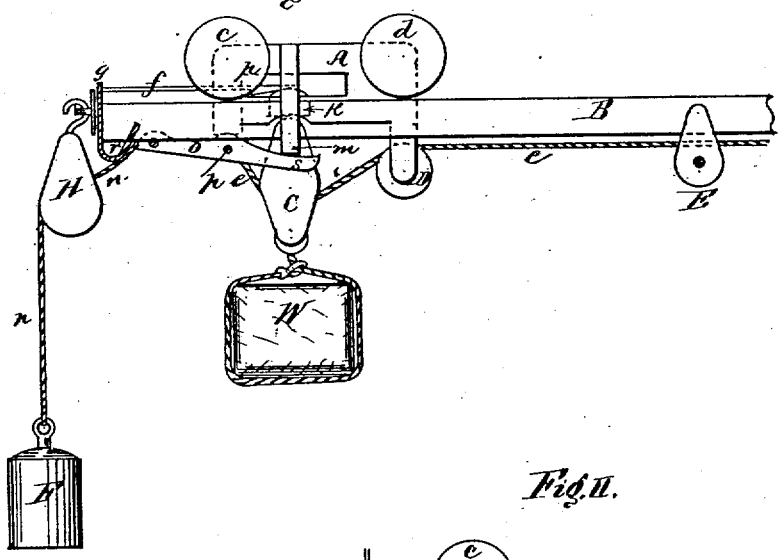
Fig. II.
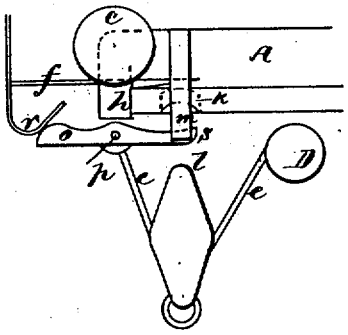
Fig. III.
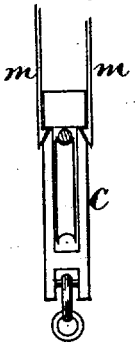
Witnesses:
Franklin Barrett.
Richard Gerner.
Inventor:
Joseph Hoffman.
Per: Henry Gerner.
Atty.
N. PETERS, PHOTO-LITHOGRAPHER, WASHINGTON, D. C.

UNITED STATES PATENT OFFICE.

JOSEPH HOFFMAN, OF LEBANON, N. J., ASSIGNOR, BY MESNE ASSIGNMENTS, OF ONE-HALF INTEREST TO NICHOLAS W. HOFFMAN.

IMPROVEMENT IN HOISTING APPARATUS.

Specification forming part of Letters Patent No. 117,778, dated August 8, 1871; reissue No. 6,597, dated August 17, 1875; application filed June 21, 1875.

*To all whom it may concern:*

Be it known that I, JOSEPH HOFFMAN, of the town of Lebanon, county of Hunterdon and State of New Jersey, have invented a new and improved machine or apparatus for raising weights or heavy bodies, as hay or other articles, into barns or buildings, and then carrying or moving the same in different directions; and I do hereby declare that the following is a full, clear, and exact description of its construction and operation, reference being had to the accompanying drawings, and to the letters of reference marked thereon, and making a part of this specification.

Hoisting mechanism, such as has heretofore been generally used for raising bodies or weights of any kind, has usually been fixed so as to be adapted only to the elevating of such bodies; and, if it were then necessary or desired to move the thing raised in another direction, or to a different part of the building, this has been done either by manual labor, or by some device or mechanism other than that used for elevating.

My invention consists in so constructing the mechanism or apparatus that is used for hoisting or raising any body that it will, as soon as the body is raised to the desired position, be changed into a carrying apparatus, to move or carry the article raised to the desired position.

Figures I and II are vertical sectional views of such apparatus, showing different positions of the several parts. Fig. III shows the manner of sustaining the hoisting-tackle after the body has been raised.

The hoisting apparatus or mechanism, instead of being permanently or temporarily fixed to any part of a building, is supported by the rollers *a b c d*, which rest and move upon the tracks or ways B B. The drawings represent such track placed in the upper part of a barn, where it would be fixed when the apparatus was to be used for unloading and carrying away hay, grain, &c.; but it can be laid in any other part of a building, or wherever desired. From the frame or body A, which is supported on the rollers before mentioned, is suspended a rope, *e*, which passes under the hoisting-pulley C, and then over another pulley, D, attached to the frame A, and then over the pulley E, which is fastened to the building in the direction of the track B B. To the rope, after it has passed over the last-mentioned pulley, power (horse or other power) is applied to raise the body or weight desired. It is necessary, however, that the frame or carriag A should be held fast while the weight or article is being raised, or it will be moved along on the track B B by the action of the rope over the pulley E. This end, holding the part A so that it cannot move on the track B B while any body is being raised, is secured, by means of a drop or spring catch, *f*, one end of which is fixed to some convenient part of the building, as at *g*, and the other end of which falls over a lip or shoulder, *h*, in the frame A, and thereby holds the apparatus while the weight is being raised against the pull of the rope *e* over the pulley E. As soon, however, as the weight or body is fully raised, the apparatus A is to be converted into a carrying-machine, and must be released from the hold of the catch *f*. Such hook or catch *f* is detached from the apparatus A in the following manner: Within the frame A, and directly under the end of the hook or catch *f*, is a movable tongue or piece, *k*, which admits of being elevated, and which, when so raised, strikes against the catch-hook *f*, and lifts it from the lip or shoulder *h*. Such movable piece *k* is so raised against the hook-catch *f* by the upper end *l* of the pulley-block C, which is extended and tapered for such purpose.

Fig. I shows the catch *f* being elevated by the action of the pulley-block against the piece *k*; and Fig. II shows such catch over the shoulder *h*.

It will be noticed that the hook or catch *f* is over the shoulder *h*, and holds the apparatus A securely while the weight is being raised, and that such catch is not disconnected and the apparatus A released therefrom until the weight has been fully raised and there is no longer any necessity for the hoisting apparatus to be held. As soon as the catch *f* is so disconnected from the hoisting apparatus the carriage or frame A is free to move on the track B B, and the power applied to the rope *e* will at once carry or move the whole apparatus and the load supported by it in whatever direction the track is laid and pulley E fixed. To support the weight W and relieve the rope *e* from sustaining it after it has been raised, the upper part *l* of the pulley-block C is made with shoulders on each side, as shown in Fig. III, into which drop the hooks or catches *m*, when the pulley C is carried to the position shown in Fig. I. By causing the weight to be so supported from the hoisting apparatus no exertion of power is required to keep the body elevated, but only sufficient to move or carry it along on the track B B to any desired point, where it is disconnected from the pulley C.

In the drawings the weight is represented as connected to the pulley C by a rope or hook, but when the apparatus is to be applied to the raising of hay and grain into a barn the fork will be connected with the pulley so as to take hold of the hay in the same manner as ordinary power-forks used for unloading hay do, and such fork will be opened or released by a cord, as in other cases. As soon as the weight or body raised has been disconnected from the pulley C, the weight F, which is connected to the apparatus or machine A by the rope *n* passing over the pulley H, draws back such carriage and apparatus to the place where another weight is to be raised. The weight F should be only heavy enough for such purpose. As the hoisting carrying apparatus is so drawn back by the weight F, the end of the lever *o*, which turns on a pivot, *p*, strikes against the incline *r* and is forced downward carrying up the other end *s* of such lever (similar letters being on each side of the mechanism) and opening or spreading the hooks *m* and releasing the pulley C, so that it at once descends by its own weight. As soon as such pulley so descends, the tongue or piece *k* falls, as seen in Fig. II, being no longer held up by the upper end of such pulley, and the hook-catch *f* drops over the shoulder *h* and holds the apparatus A until such time as another weight has been raised, and the pulley-block C again presses upward the piece *k* and releases the carriage from the hook-catch *f*.

From the foregoing description it will be seen that the same mechanism acts both as a hoisting and a carrying machine, is held fast while the body is being raised, and is set free when it is to act as a vehicle for carrying the thing raised to any point, and that all its several and different operations are automatic and take place at the exact times required for a continuous working of the whole apparatus. By a slight change in construction the apparatus may be supported by two rollers instead of four and only a single track, B, be required. The carriage may also be carried back by a spring, under some circumstances, instead of by the weight F, or the track may be a little inclined, so that the carriage will run back of its own gravity. The hooks *m m* to support the raised body may also be dispensed with and not affect the other operations of the apparatus.

This machine or apparatus may be used with great economy in the unloading and moving away of hay, for raising soaked hides to the drying-rooms, and there distributing them, and in very many other similar applications.

In a hoisting apparatus having track B B for such apparatus to move upon, so that the same apparatus or mechanism can be used to raise any weight or body, and also to carry or move such body, when raised, in different directions, what I claim as my invention, and desire to secure by Letters Patent, is—

1. The elevating pulley and the weight-ropes *n e*, the hooks *m m* or their equivalent, in combination with the lever *o s*, and incline *r*, for disengaging the pulley, substantially as and for the purposes set forth.

2. The arrangement of the hook or lever catch *f*, and movable block *k*, in combination with the catch-rods *m m*, lever *o s*, and frame A, as and for the purposes described.

This specification signed this 10th day of May, 1875.

JOSEPH HOFFMAN.

Witnesses:
ANTON C. CRONDAL,
RICHD. GERNER.